United States Patent
Koevoets et al.

(10) Patent No.: US 10,213,980 B2
(45) Date of Patent: Feb. 26, 2019

(54) LINED PIPES AND FITTINGS, ASSOCIATED FORMING METHOD, AND METHOD OF IMPROVING THE CHLORINE RESISTANCE OF HIGH DENSITY POLYETHYLENE PIPES

(71) Applicant: SABIC Global Technologies B.V., Bergen op Zoom (NL)

(72) Inventors: Christiaan Henricus Johannes Koevoets, Roosendaal (NL); Johannes Everardus Fortuijn, Bergen op Zoom (NL); Biagio Banfi, Rovello Porro (IT)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/556,049

(22) PCT Filed: Feb. 29, 2016

(86) PCT No.: PCT/IB2016/051111
§ 371 (c)(1),
(2) Date: Sep. 6, 2017

(87) PCT Pub. No.: WO2016/142803
PCT Pub. Date: Sep. 15, 2016

(65) Prior Publication Data
US 2018/0056622 A1     Mar. 1, 2018

Related U.S. Application Data

(60) Provisional application No. 62/129,988, filed on Mar. 9, 2015.

(51) Int. Cl.
| | |
|---|---|
| *B32B 1/08* | (2006.01) |
| *B32B 25/08* | (2006.01) |
| *B32B 25/16* | (2006.01) |
| *B32B 27/08* | (2006.01) |
| *B32B 27/20* | (2006.01) |

(Continued)

(52) U.S. Cl.
CPC ............. *B32B 1/08* (2013.01); *B32B 25/08* (2013.01); *B32B 25/16* (2013.01); *B32B 27/08* (2013.01);
(Continued)

(58) Field of Classification Search
CPC ......... B32B 1/08; B32B 27/28; B32B 27/285; B32B 27/302; B32B 27/08; B32B 27/16;
(Continued)

(56) References Cited

U.S. PATENT DOCUMENTS

| | | | |
|---|---|---|---|
| 4,950,436 A | 8/1990 | Kitami et al. | |
| 6,238,575 B1 | 5/2001 | Patil | |

(Continued)

FOREIGN PATENT DOCUMENTS

| | | |
|---|---|---|
| CN | 102359667 | 2/2012 |
| EP | 0442457 A2 | 8/1991 |

(Continued)

OTHER PUBLICATIONS

Gua, H. et al., "Polyphenylene Ether Adhesive", IP.com Prior Art Database Technical Disclosure: IP.com No. IPCOM000029343D; Electronic Publication: Jun. 24, 2004; Date of download: Oct. 22, 2014; 25 pages.

(Continued)

*Primary Examiner* — James C Yager
(74) *Attorney, Agent, or Firm* — Cantor Colburn LLP

(57) ABSTRACT

A lined pipe or fitting includes an outer layer containing high density polyethylene, and an inner layer containing a blend of poly(phenylene ether), polystyrene, and, optionally, a hydrogenated block copolymer. Relative to corresponding pipes and fittings made from high density polyethylene alone, the lined pipes and fittings exhibit improved resistance to chlorine and chlorine derivatives.

16 Claims, 3 Drawing Sheets

(51) Int. Cl.
*B32B 27/28* (2006.01)
*B32B 27/30* (2006.01)
*B32B 27/32* (2006.01)
*C08L 25/06* (2006.01)
*C08L 71/12* (2006.01)

(52) U.S. Cl.
CPC .............. *B32B 27/20* (2013.01); *B32B 27/28* (2013.01); *B32B 27/285* (2013.01); *B32B 27/302* (2013.01); *B32B 27/32* (2013.01); *C08L 25/06* (2013.01); *C08L 71/123* (2013.01); *B32B 2250/02* (2013.01); *B32B 2270/00* (2013.01); *B32B 2274/00* (2013.01); *B32B 2307/306* (2013.01); *B32B 2307/54* (2013.01); *B32B 2307/546* (2013.01); *B32B 2307/558* (2013.01); *B32B 2307/714* (2013.01); *B32B 2597/00* (2013.01)

(58) Field of Classification Search
CPC ......... B32B 25/08; B32B 25/16; B32B 27/20; B32B 27/27; B32B 27/32; B32B 2250/02; B32B 2274/00; B32B 2270/00; B32B 2307/558; B32B 2307/54; B32B 2307/546; B32B 2307/714; B32B 2307/306; B32B 2597/00; C08L 25/06; C08L 71/123
See application file for complete search history.

(56) References Cited

U.S. PATENT DOCUMENTS

| | | |
|---|---|---|
| 6,241,840 B1 | 6/2001 | Pratt et al. |
| 2003/0049402 A1 | 3/2003 | Sato et al. |
| 2003/0130421 A1 | 7/2003 | Sato |
| 2009/0082520 A1 | 3/2009 | Zijlma et al. |
| 2010/0159178 A1 | 6/2010 | Seboe et al. |
| 2012/0305083 A1 | 12/2012 | Dahl et al. |
| 2013/0142976 A1 | 6/2013 | Koevoets et al. |

FOREIGN PATENT DOCUMENTS

| | | |
|---|---|---|
| EP | 1291387 A1 | 12/2003 |
| JP | 2004160993 | 6/2004 |
| JP | 2005239784 | 9/2005 |
| WO | 200303004573 A1 | 1/2003 |
| WO | 2014074596 | 5/2014 |

OTHER PUBLICATIONS

International Search Report for International Application No. PCT/IB2016/051111; International Filing Date: Feb. 29, 2016; dated May 20 2016; 6 pages.

Written Opinion of the International Searching Authority for International Application No. PCT/IB2016/051111; International Filing Date: Feb. 29, 2016; dated May 20 2016; 5 pages.

LINED PIPES AND FITTINGS, ASSOCIATED FORMING METHOD, AND METHOD OF IMPROVING THE CHLORINE RESISTANCE OF HIGH DENSITY POLYETHYLENE PIPES

CROSS-REFERENCE TO RELATED APPLICATIONS

This application is a National Stage application of PCT/IB2016/051111, filed Feb. 29, 2016, which claims the benefit of U.S. Provisional Application No. 62/129,988, filed Mar. 09, 2015, both of which are incorporated by reference herein in their entirety.

BACKGROUND OF THE INVENTION

High density polyethylene is a plastic commonly used to make water pipes and fittings. Relative to pipe made from various metals and metal alloys, high density polyethylene has the advantages of being light, easy to mold, and inexpensive. However, in long term use pipes and fittings made from high density polyethylene can be chemically attacked by chlorine and chlorine derivatives that are either naturally occurring or intentionally added to water supplies. There is therefore a desire for high density polyethylene pipes and fitting with greater resistance to chlorine and chlorine derivatives.

BRIEF SUMMARY OF EMBODIMENTS OF THE INVENTION

One embodiment is a lined pipe or fitting comprising: an outer layer comprising an outer layer composition comprising, based on the total weight of the outer layer composition, 50 to 100 weight percent high density polyethylene and 0 to 50 weight percent filler; and an inner layer comprising an inner layer composition comprising 20 to 70 parts by weight of a poly(phenylene ether), 30 to 80 parts by weight of a polystyrene, and 0 to 15 parts by weight of a hydrogenated block copolymer of an alkenyl aromatic monomer and a conjugated diene, wherein the parts by weight are based on 100 parts by weight total of the poly(phenylene ether), the polystyrene, and the hydrogenated block copolymer.

Another embodiment is a method of forming a lined pipe or fitting, comprising: coextruding an outer layer, annular in cross-section and characterized by a first outer diameter, a first inner diameter and a first wall thickness; wherein the outer layer comprises an outer layer composition comprising, based on the total weight of the outer layer composition, 50 to 100 weight percent high density polyethylene and 0 to 50 weight percent filler; and an inner layer, annular in cross-section and characterized by a second outer diameter less than the first inner diameter, a second inner diameter, and a second wall thickness; wherein the inner layer comprises an inner layer composition comprising 20 to 70 parts by weight of a poly(phenylene ether), 30 to 80 parts by weight of a polystyrene, and 0 to 15 parts by weight of a hydrogenated block copolymer of an alkenyl aromatic monomer and a conjugated diene, wherein the parts by weight are based on 100 parts by weight total of the poly(phenylene ether), the polystyrene, and the hydrogenated block copolymer.

Another embodiment is a method for improving the chlorine resistance of high density polyethylene pipe, comprising: lining the high density polyethylene pipe with a layer of a lining composition comprising 20 to 70 parts by weight of a poly(phenylene ether), 30 to 80 parts by weight of a polystyrene, and 0 to 15 parts by weight of a hydrogenated block copolymer of an alkenyl aromatic monomer and a conjugated diene; wherein the parts by weight are based on 100 parts by weight total of the poly(phenylene ether), the polystyrene, and the hydrogenated block copolymer.

These and other embodiments are described in detail below.

BRIEF DESCRIPTION OF THE DRAWINGS

Referring now to the drawings wherein like elements are numbered alike in several FIGURES.

DETAILED DESCRIPTION OF THE INVENTION

The present inventors have determined that greater resistance to chlorine and chlorine derivatives is exhibited by high density polyethylene pipes when they include an inner layer of a particular poly(phenylene ether) composition. Thus, one embodiment is a lined pipe or fitting comprising: an outer layer comprising an outer layer composition comprising, based on the total weight of the outer layer composition, 50 to 100 weight percent high density polyethylene and 0 to 50 weight percent filler; and an inner layer comprising an inner layer composition comprising 20 to 70 parts by weight of a poly(phenylene ether), 30 to 80 parts by weight of a polystyrene, and 0 to 15 parts by weight of a hydrogenated block copolymer of an alkenyl aromatic monomer and a conjugated diene, wherein the parts by weight are based on 100 parts by weight total of the poly(phenylene ether), the polystyrene, and the hydrogenated block copolymer.

Figure 1:
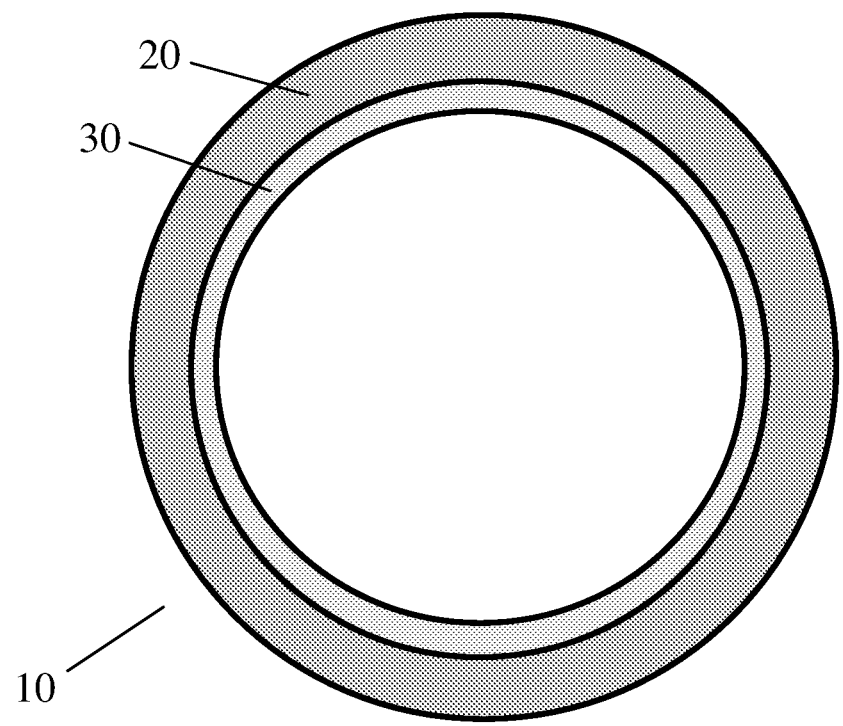
FIG. 1 is a cross-sectional view of a lined pipe 10 comprising an outer layer 20 and an inner layer 30.
Figure 2:
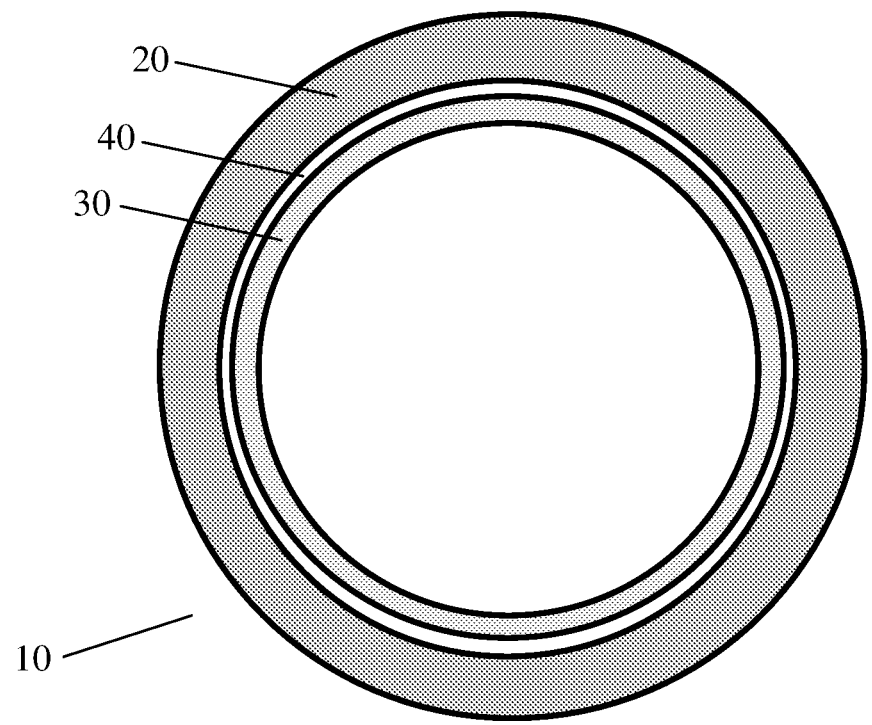
FIG. 2 is a cross-sectional view of a lined pipe 10 comprising an outer layer 20, an inner layer 30, and an intermediate layer 40.
Figure 3:
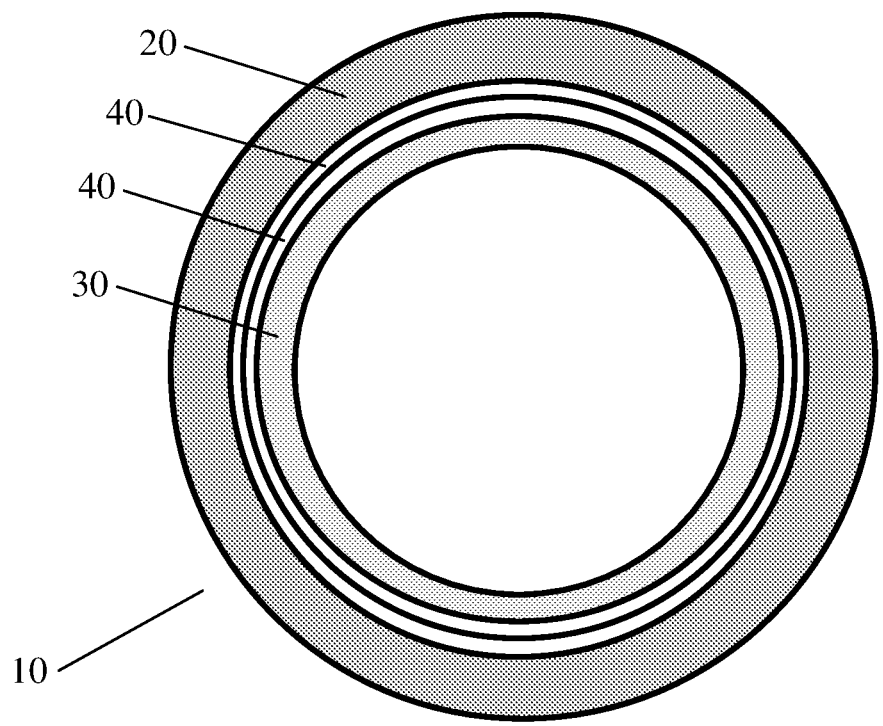
FIG. 3 is a cross-sectional view of a lined pipe 10 comprising an outer layer 20, an inner layer 30, and two intermediate layers 40.

One embodiment relates to a lined pipe or a lined pipe fitting. Pipe fittings include, for example, couplings, elbows, bends, returns, tees, reducers, expanders, and valves. One embodiment, illustrated in FIG. 1, is a pipe 10 comprising an outer layer 20 and an inner layer 30. Another embodiment, illustrated in FIG. 2, is a pipe 10 comprising an outer layer 20, an inner layer 30, and an intermediate layer 40 between the outer layer 20 and the inner layer 30. Another embodiment, illustrated in FIG. 3, is a pipe 10 comprising an outer layer 20, an inner layer 30, and two intermediate layers 40, each between the outer layer 20 and the inner layer 30. When there are two or more intermediate layers, they can have compositions that are the same as or different from each other. The compositions of the various layers are described in detail below.

The lined pipe or fitting can vary widely in size. For example, in some embodiments the outer layer has an outer diameter of 20 millimeters to 1.6 meters and a ratio of outer diameter to wall thickness of 7:1 to 45:1. In these embodiments, the inner layer can, optionally, have an outer diameter of 12 millimeters to 1.55 meters and/or a wall thickness of 50 micrometers to one-third the wall thickness of the outer layer.

The lined pipe or fitting includes an outer layer based on high density polyethylene. The composition of the outer layer comprises 50 to 100 weight percent high density polyethylene, based on the total weight of the outer layer composition. Within this range, the high density polyethylene content can be 70 to 100 weight percent, specifically 80 to 100 weight percent, more specifically 90 to 100 weight percent, still more specifically 95 to 100 weight percent. Other than high density polyethylene, the outer layer composition can, optionally, include up to 50 weight percent of fillers. Suitable fillers include talc, clay, mica, calcium carbonate, and combinations thereof. Within the range of 0 to 50 weight percent, the filler amount can be 5 to 50 weight percent, specifically 10 to 40 weight percent, more specifically 10 to 30 weight percent. The outer layer composition can, optionally, also include up to 10 weight percent of additives selected from the group consisting of colorants, UV blockers, antioxidants, stabilizers, processing aids, and combinations thereof. Within the limit of 10 weight percent, the additive amount can be 0 to 5 weight percent, specifically 0 to 2 weight percent.

In addition to the outer layer, the lined pipe or fitting includes an inner layer that protects the outer layer from chlorine and chlorine derivatives present in water flowing through the pipe or fitting. The composition of the inner layer comprises a poly(phenylene ether). The poly(phenylene ether) comprises repeat units of the formula

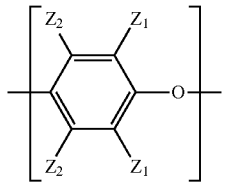

wherein each occurrence of $Z^1$ is independently $C_1$-$C_{12}$ hydrocarbylthio, $C_1$-$C_{12}$ hydrocarbyloxy, or unsubstituted or substituted $C_1$-$C_{12}$ hydrocarbyl provided that the hydrocarbyl group is not tertiary hydrocarbyl; and each occurrence of $Z^2$ is independently hydrogen, $C_1$-$C_{12}$ hydrocarbylthio, $C_1$-$C_{12}$ hydrocarbyloxy, or unsubstituted or substituted $C_1$-$C_{12}$ hydrocarbyl provided that the hydrocarbyl group is not tertiary hydrocarbyl. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. When the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can comprise molecules having aminoalkyl-containing end group(s), typically located in a position ortho to the hydroxyl group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof.

In some embodiments, the poly(phenylene ether) has an intrinsic viscosity of 0.25 to 1 deciliter per gram measured by Ubbelohde viscometer at 25° C. in chloroform. Within this range, the poly(phenylene ether) intrinsic viscosity can be 0.3 to 0.6 deciliter per gram, more specifically 0.35 to 0.55 deciliter per gram.

In some embodiments, the poly(phenylene ether) comprises a homopolymer or copolymer of monomers selected from the group consisting of 2,6-dimethylphenol, 2,3,6-trimethylphenol, and combinations thereof. In some embodiments, the poly(phenylene ether) comprises a poly(2,6-dimethyl-1,4-phenylene ether) having an intrinsic viscosity of 0.3 to 0.6 deciliter per gram, measured at 25° C. in chloroform.

The inner layer composition comprises 20 to 70 parts by weight of the poly(phenylene ether), based on 100 parts by weight total of the poly(phenylene ether), the polystyrene, and the hydrogenated block copolymer. Within the range of 20 to 70 parts by weight, the poly(phenylene ether) amount can be 30 to 60 parts by weight, specifically 30 to 50 parts by weight.

In addition to the poly(phenylene ether), the inner layer composition comprises polystyrene. As used herein, the term polystyrene means a homopolymer of styrene. The polystyrene can be atactic, syndiotactic, or isotactic, or a combination thereof. In some embodiments, the polystyrene comprises atactic homopolystyrene. In some embodiments, the polystyrene comprises an atactic homopolystyrene having a having a melt flow index of 1.5 to 5 grams per 10 minutes, specifically 1.5 to 3.5 grams per 10 minutes, more specifically 1.9 to 2.9 grams per 10 minutes, measured according to ISO 1133-4 (2011) at 200° C. and 5 kilogram load. In some embodiments, the polystyrene excludes syndiotactic homopolystyrene.

The inner layer composition comprises 30 to 80 parts by weight of the polystyrene, based on 100 parts by weight total of the poly(phenylene ether), the polystyrene, and the hydrogenated block copolymer. Within the range of 30 to 80 parts by weight, the polystyrene amount can be 40 to 70 parts by weight, specifically 40 to 60 parts by weight.

In some embodiments, the inner layer composition comprises a hydrogenated block copolymer of an alkenyl aromatic monomer and a conjugated diene. For brevity, this component is referred to as the "hydrogenated block copolymer". The hydrogenated block copolymer can comprise 10 to 90 weight percent of poly(alkenyl aromatic) content and 90 to 10 weight percent of hydrogenated poly(conjugated diene) content, based on the weight of the hydrogenated block copolymer. In some embodiments, the hydrogenated block copolymer is a low poly(alkenyl aromatic content) hydrogenated block copolymer in which the poly(alkenyl aromatic) content is 10 to less than 40 weight percent, specifically 20 to 35 weight percent, more specifically 25 to 35 weight percent, all based on the weight of the low poly(alkenyl aromatic content) hydrogenated block copolymer. In other embodiments, the hydrogenated block copolymer is a high poly(alkenyl aromatic) content hydrogenated block copolymer in which the poly(alkenyl aromatic) content is 40 to 90 weight percent, specifically 50 to 80 weight percent, more specifically 60 to 70 weight percent, all based on the weight of the high poly(alkenyl aromatic content) hydrogenated block copolymer.

In some embodiments, the hydrogenated block copolymer has a weight average molecular weight of 40,000 to 400,000 atomic mass units. The number average molecular weight and the weight average molecular weight can be determined by gel permeation chromatography and based on comparison to polystyrene standards. In some embodiments, the hydrogenated block copolymer has a weight average molecular weight of 200,000 to 400,000 atomic mass units.

The alkenyl aromatic monomer used to prepare the hydrogenated block copolymer can have the structure

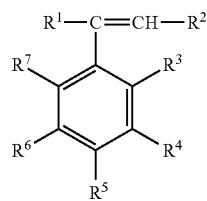

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom or a $C_1$-$C_8$ alkyl group; and $R^4$, $R^5$, and $R^6$ each independently represent a hydrogen atom, a $C_1$-$C_8$ alkyl group, or a $C_2$-$C_8$ alkenyl group, or $R^4$ and $R^5$ are taken together with the central aromatic ring to form a naphthyl group, or $R^5$ and $R^6$ are taken together with the central aromatic ring to form a naphthyl group. Specific alkenyl aromatic monomers include, for example, styrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and combinations thereof. In some embodiments, the conjugated diene is 1,3-butadiene, 2-methyl-1,3-butadiene, or a combination thereof. In some embodiments, the conjugated diene is 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the hydrogenated block copolymer is a diblock copolymer, a triblock copolymer, or a combination thereof.

In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms. In other embodiments, the hydrogenated block copolymer includes the residue of one or more acid functionalizing agents, such as maleic anhydride.

In some embodiments, the hydrogenated block copolymer comprises a polystyrene-poly(ethylene-butylene)-polystyrene triblock copolymer having a weight average molecular weight of 200,000 to 400,000 daltons.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Performance Polymers Inc. as KRATON™ G1701 (having about 37 weight percent polystyrene) and G1702 (having about 28 weight percent polystyrene); the polystyrene-poly(ethylene-butylene)-polystyrene triblock copolymers available from Kraton Performance Polymers Inc. as KRATON™ G1641 (having about 33 weight percent polystyrene), G1650 (having about 30 weight percent polystyrene), G1651 (having about 33 weight percent polystyrene), and G1654 (having about 31 weight percent polystyrene); and the polystyrene-poly(ethylene-ethylene/propylene)-polystyrene triblock copolymers available from Kuraray as SEPTON™ S4044, S4055, S4077, and S4099. Additional commercially available hydrogenated block copolymers include polystyrene-poly(ethylene-butylene)-polystyrene (SEBS) triblock copolymers available from Dynasol as CALPRENE™ H6140 (having about 31 weight percent polystyrene), H6170 (having about 33 weight percent polystyrene), H6171 (having about 33 weight percent polystyrene), and H6174 (having about 33 weight percent polystyrene); and from Kuraray as SEPTON™ 8006 (having about 33 weight percent polystyrene) and 8007 (having about 30 weight percent polystyrene); polystyrene-poly(ethylene-propylene)-polystyrene (SEPS) copolymers available from Kuraray as SEPTON™ 2006 (having about 35 weight percent polystyrene) and 2007 (having about 30 weight percent polystyrene); and oil-extended compounds of these hydrogenated block copolymers available from Kraton Performance Polymers Inc. as KRATON™ G4609 (containing about 45% mineral oil, and the SEBS having about 33 weight percent polystyrene) and G4610 (containing about 31% mineral oil, and the SEBS having about 33 weight percent polystyrene); and from Asahi as TUFTEC™ H1272 (containing about 36% oil, and the SEBS having about 35 weight percent polystyrene). Mixtures of two of more hydrogenated block copolymers can be used.

When present in the inner layer composition, the hydrogenated block copolymer can be used in an amount of 1 to 15 parts by weight, based on 100 parts by weight total of the poly(phenylene ether), the polystyrene, and the hydrogenated block copolymer. Within this range, the hydrogenated block copolymer amount can be 2 to 15 parts by weight, specifically 5 to 15 parts by weight, more specifically 8 to 14 parts by weight.

In some applications, including piping for potable water, the inner layer composition comprises less than 1 part per million by weight of free butadiene, based on the total weight of the inner layer composition. The presence of free (unpolymerized) butadiene is generally associated with the presence of unhydrogenated polymers and copolymers comprising polybutadiene. For example, including in the inner layer composition a polybutadiene-containing rubber-modified polystyrene can make it difficult to achieve a free butadiene concentration less than 1 part per million. So, in some embodiments, the inner layer composition excludes rubber-modified polystyrene. It should be noted that it is possible to achieve a free butadiene content less than 1 part per million while still including in the inner layer composition hydrogenated polymers and copolymers in which polybutadiene has been hydrogenated.

The inner layer composition can, optionally, further comprise one or more fillers in an amount of up to 100 parts by weight per 100 parts by weight total of the poly(phenylene ether), the polystyrene, and the hydrogenated block copolymer. Suitable fillers include talc, clay, mica, calcium carbonate, and combinations thereof. Within the range of 0 to 100 parts by weight, the filler amount can be 10 to 100 parts by weight, specifically 10 to 60 parts by weight, more specifically 10 to 40 parts by weight. The inner layer composition can, optionally, further comprise one or more additives known in the thermoplastics art. For example, the inner layer composition can, optionally, further comprise an additive selected from the group consisting of stabilizers, mold release agents, lubricants, processing aids, UV blockers, dyes, pigments, antioxidants, anti-static agents, mineral oil, metal deactivators, and combinations thereof. When present, such additives are typically used in a total amount of less than or equal to 10 parts by weight, specifically less than or equal to 5 parts by weight, more specifically less than or equal to 2 parts by percent, based on 100 parts by weight total of the poly(phenylene ether), the polystyrene, and the hydrogenated block copolymer.

The inner layer composition can, optionally, minimize or exclude components not described herein as required. In some embodiments, the inner layer composition excludes glass fibers. In some embodiments, the inner layer composition excludes polyamides. In some embodiments, the inner layer composition comprises 0 to 2 parts by weight of polyolefins. In some embodiments, the inner layer composition comprises 0 to 2 parts by weight of low density polyethylene and otherwise excludes polyolefins.

In addition to the outer layer and the inner layer, the lined pipe or fitting can, optionally, include at least one intermediate layer disposed between the outer layer and the inner layer. In some embodiments, the lined pipe or fitting comprises two intermediate layers. In other embodiments, the lined pipe or fitting comprises three intermediate layers. The one or more intermediate layers can each independently comprise a material selected from the group consisting of aromatic epoxy resins, acid-functionalized polyolefins (including maleic anhydride-functionalized high density polyethylene), acid-functionalized poly(phenylene ether)s (including maleic anhydride-functionalized poly(phenylene ether)s), styrene-maleic anhydride copolymers, and combinations thereof.

In a very specific embodiment of the lined pipe or fitting, the outer layer composition comprises 95 to 100 weight percent high density polyethylene; the poly(phenylene ether) comprises a poly(2,6-dimethyl-1,4-phenylene ether) having an intrinsic viscosity of 0.3 to 0.6 deciliter per gram, measured at 25° C. in chloroform; the polystyrene comprises an atactic homopolystyrene having a having a melt flow index of 1.5 to 3.5 grams per 10 minutes measured according to ISO 1133-4 (2011) at 200° C. and 5 kilogram load; the hydrogenated block copolymer comprises a polystyrene-poly(ethylene-butylene)-polystyrene triblock copolymer having a weight average molecular weight of 200,000 to 400,000 daltons; and the inner layer composition comprises 35 to 45 parts by weight of the poly(phenylene ether), 42 to 52 parts by weight of the polystyrene, and 5 to 15 parts by weight of the hydrogenated block copolymer. In this embodiment, the inner layer composition can, optionally, comprise less than 1 part per million by weight of free butadiene. Also in this embodiment, the inner layer composition can, optionally, exclude rubber-modified polystyrene.

Another embodiment is a method of forming a lined pipe or fitting, comprising: coextruding an outer layer, annular in cross-section and characterized by a first outer diameter, a first inner diameter and a first wall thickness; wherein the outer layer comprises an outer layer composition comprising, based on the total weight of the outer layer composition, 50 to 100 weight percent high density polyethylene and 0 to 50 weight percent filler; and an inner layer, annular in cross-section and characterized by a second outer diameter less than the first inner diameter, a second inner diameter, and a second wall thickness; wherein the inner layer comprises an inner layer composition comprising 20 to 70 parts by weight of a poly(phenylene ether), 30 to 80 parts by weight of a polystyrene, and 0 to 15 parts by weight of a hydrogenated block copolymer of an alkenyl aromatic monomer and a conjugated diene, wherein the parts by weight are based on 100 parts by weight total of the poly(phenylene ether), the polystyrene, and the hydrogenated block copolymer. Coextruding can be conducted with a pipe coextruder, operating at a temperature of 230 to 260° C., specifically 235 to 255° C., for the outer layer, and 230 to 260° C., specifically 235 to 255° C., for the inner layer. If one or more intermediate layers are coextruded with the outer layer and the inner layer, their extrusion temperature will depend on their composition and thermal properties and can be selected by a person skilled in the polymer arts. All of the variations described above for the lined pipe or fitting apply as well to the method of forming a lined pipe or fitting.

In some embodiments of the method, the lined pipe or fitting consists of the outer layer and the inner layer, and the second outer diameter (i.e., the outer diameter of the inner layer) is 98 to less than 100 percent of the first inner diameter (i.e., the inner diameter of the outer layer), specifically 99 to less than 100 percent of the first inner diameter.

In other embodiments, the method further comprises coextruding with the outer layer and the inner layer at least one intermediate layer, annular in cross-section and characterized by a third outer diameter less than the first inner diameter and a third inner diameter greater than the second outer diameter.

In a very specific embodiment of the method of forming a lined pipe or fitting, the outer layer composition comprises 95 to 100 weight percent high density polyethylene; the poly(phenylene ether) comprises a poly(2,6-dimethyl-1,4-phenylene ether) having an intrinsic viscosity of 0.3 to 0.6 deciliter per gram, measured at 25° C. in chloroform; the polystyrene comprises an atactic homopolystyrene having a having a melt flow index of 1.5 to 3.5 grams per 10 minutes measured according to ISO 1133-4 (2011) at 200° C. and 5 kilogram load; the hydrogenated block copolymer comprises a polystyrene-poly(ethylene-butylene)-polystyrene triblock copolymer having a weight average molecular weight of 200,000 to 400,000 daltons; and the inner layer composition comprises 35 to 45 parts by weight of the poly(phenylene ether), 42 to 52 parts by weight of the polystyrene, and 5 to 15 parts by weight of the hydrogenated block copolymer. In this embodiment, the inner layer composition can, optionally, comprise less than 1 part per million by weight of free butadiene. Also in this embodiment, the inner layer composition can, optionally, exclude rubber-modified polystyrene.

Another embodiment is a method for improving the chlorine resistance of high density polyethylene pipe, comprising: lining the high density polyethylene pipe with a layer of a lining composition comprising 20 to 70 parts by weight of a poly(phenylene ether), 30 to 80 parts by weight of a polystyrene, and 0 to 15 parts by weight of a hydrogenated block copolymer of an alkenyl aromatic monomer and a conjugated diene; wherein the parts by weight are based on 100 parts by weight total of the poly(phenylene ether), the polystyrene, and the hydrogenated block copolymer. All of the variations described above for the lined pipe or fitting apply as well to the method for improving the chlorine resistance of high density polyethylene pipe.

In a very specific embodiment of the method for improving the chlorine resistance of high density polyethylene pipe, the high density polyethylene pipe comprises 95 to 100 weight percent high density polyethylene; the poly(phenylene ether) comprises a poly(2,6-dimethyl-1,4-phenylene ether) having an intrinsic viscosity of 0.3 to 0.6 deciliter per gram, measured at 25° C. in chloroform; the polystyrene comprises an atactic homopolystyrene having a having a melt flow index of 1.5 to 3.5 grams per 10 minutes measured according to ISO 1133-4 (2011) at 200° C. and 5 kilogram load; the hydrogenated block copolymer comprises a polystyrene-poly(ethylene-butylene)-polystyrene triblock copolymer having a weight average molecular weight of 200,000 to 400,000 daltons; and wherein the inner layer composition comprises 35 to 45 parts by weight of the poly(phenylene ether), 42 to 52 parts by weight of the polystyrene, and 5 to 15 parts by weight of the hydrogenated block copolymer.

The invention includes at least the following embodiments.

Embodiment 1: A lined pipe or fitting comprising: an outer layer comprising an outer layer composition comprising, based on the total weight of the outer layer composition, 50 to 100 weight percent high density polyethylene and 0 to 50 weight percent filler; and an inner layer comprising an inner layer composition comprising 20 to 70 parts by weight of a poly(phenylene ether), 30 to 80 parts by weight of a polystyrene, and 0 to 15 parts by weight of a hydrogenated block copolymer of an alkenyl aromatic monomer and a conjugated diene, wherein the parts by weight are based on 100 parts by weight total of the poly(phenylene ether), the polystyrene, and the hydrogenated block copolymer.

Embodiment 2: The lined pipe or fitting of embodiment 1, wherein the lined pipe or fitting is used for potable water, and the inner layer composition comprises less than 1 part per million by weight of free butadiene.

Embodiment 3: The lined pipe or fitting of embodiment 1 or 2, wherein the inner layer composition excludes rubber-modified polystyrene.

Embodiment 4: The lined pipe or fitting of any of embodiments 1-3, wherein the polystyrene is selected from the group consisting of atactic homopolystyrenes, syndiotactic homopolystyrenes, isotactic homopolystyrenes, and combinations thereof.

Embodiment 5: The lined pipe or fitting of any of embodiments 1-3, wherein the polystyrene comprises an atactic homopolystyrene having a having a melt flow index of 1.5 to 5 grams per 10 minutes measured according to ISO 1133-4 (2011) at 200° C. and 5 kilogram load.

Embodiment 6: The lined pipe or fitting of any one of embodiments 1-5, wherein the inner layer composition comprises 5 to 15 parts by weight of the hydrogenated block copolymer.

Embodiment 7: The lined pipe or fitting of embodiment 6, wherein the hydrogenated block copolymer comprises a polystyrene-poly(ethylene-butylene)-polystyrene triblock copolymer having a weight average molecular weight of 200,000 to 400,000 daltons.

Embodiment 8: The lined pipe or fitting of any one of embodiments 1-7, wherein the inner layer composition excludes glass fibers.

Embodiment 9: The lined pipe or fitting of any one of embodiments 1-8, wherein the inner layer composition excludes polyamides.

Embodiment 10: The lined pipe or fitting of any one of embodiments 1-9, wherein the inner layer composition comprises 0 to 2 parts by weight of polyolefins.

Embodiment 11: The lined pipe or fitting of any one of embodiments 1-10, wherein the outer layer has an outer diameter of 20 millimeters to 1.6 meters and a ratio of outer diameter to wall thickness of 7:1 to 45:1.

Embodiment 12: The lined pipe or fitting of any one of embodiments 1-10, wherein the outer layer has an outer diameter of 20 millimeters to 1.6 meters and a ratio of outer diameter to wall thickness of 7:1 to 45:1; and wherein the inner layer has a wall thickness of 50 micrometers to one-third the wall thickness of the outer layer.

Embodiment 13: The lined pipe or fitting of any one of embodiments 1-12, further comprising at least one intermediate layer disposed between the outer layer and the inner layer.

Embodiment 14: The lined pipe or fitting of embodiment 13, wherein the at least one intermediate layer comprises a material selected from the group consisting of aromatic epoxy resins, acid-functionalized polyolefins (including maleic anhydride functionalized polyolefins), acid-functionalized poly(phenylene ether)s (including maleic anhydride functionalized poly(phenylene ether)s), styrene-maleic anhydride copolymers, and combinations thereof.

Embodiment 15: The lined pipe or fitting of embodiment 1, wherein the outer layer composition comprises 95 to 100 weight percent high density polyethylene; wherein the poly (phenylene ether) comprises a poly(2,6-dimethyl-1,4-phenylene ether) having an intrinsic viscosity of 0.3 to 0.6 deciliter per gram, measured at 25° C. in chloroform; wherein the polystyrene comprises an atactic homopolystyrene having a having a melt flow index of 1.5 to 3.5 grams per 10 minutes measured according to ISO 1133-4 (2011) at 200° C. and 5 kilogram load; wherein the hydrogenated block copolymer comprises a polystyrene-poly(ethylene-butylene)-polystyrene triblock copolymer having a weight average molecular weight of 200,000 to 400,000 daltons; and wherein the inner layer composition comprises 35 to 45 parts by weight of the poly(phenylene ether), 42 to 52 parts by weight of the polystyrene, and 5 to 15 parts by weight of the hydrogenated block copolymer.

Embodiment 16: A method of forming a lined pipe or fitting, comprising: coextruding an outer layer, annular in cross-section and characterized by a first outer diameter, a first inner diameter and a first wall thickness; wherein the outer layer comprises an outer layer composition comprising, based on the total weight of the outer layer composition, 50 to 100 weight percent high density polyethylene and 0 to 50 weight percent filler; and an inner layer, annular in cross-section and characterized by a second outer diameter less than the first inner diameter, a second inner diameter, and a second wall thickness; wherein the inner layer comprises an inner layer composition comprising 20 to 70 parts by weight of a poly(phenylene ether), 30 to 80 parts by weight of a polystyrene, and 0 to 15 parts by weight of a hydrogenated block copolymer of an alkenyl aromatic monomer and a conjugated diene, wherein the parts by weight are based on 100 parts by weight total of the poly(phenylene ether), the polystyrene, and the hydrogenated block copolymer.

Embodiment 16a: The method of embodiment 16, wherein the lined pipe or fitting consists of the outer layer and the inner layer, and wherein the second outer diameter is 98 to less than 100 percent of the first inner diameter.

Embodiment 16b: The method of embodiment 16 or 16a, further comprising coextruding with the outer layer and the inner layer at least one intermediate layer, annular in cross-section and characterized by a third outer diameter less than the first inner diameter and a third inner diameter greater than the second outer diameter.

Embodiment 16c The method of embodiment 16b, wherein the at least one intermediate layer comprises a material selected from the group consisting of aromatic epoxy resins, acid-functionalized polyolefins (including maleic anhydride functionalized polyolefins), acid-functionalized poly(phenylene ether)s (including maleic anhydride functionalized poly(phenylene ether)s), styrene-maleic anhydride copolymers, and combinations thereof.

Embodiment 17: The method of embodiment 16, wherein the outer layer composition comprises 95 to 100 weight percent high density polyethylene; wherein the poly(phenylene ether) comprises a poly(2,6-dimethyl-1,4-phenylene ether) having an intrinsic viscosity of 0.3 to 0.6 deciliter per gram, measured at 25° C. in chloroform; wherein the polystyrene comprises an atactic homopolystyrene having a having a melt flow index of 1.5 to 3.5 grams per 10 minutes measured according to ISO 1133-4 (2011) at 200° C. and 5 kilogram load; wherein the hydrogenated block copolymer comprises a polystyrene-poly(ethylene-butylene)-polystyrene triblock copolymer having a weight average molecular weight of 200,000 to 400,000 daltons; and wherein the inner layer composition comprises 35 to 45 parts by weight of the poly(phenylene ether), 42 to 52 parts by weight of the polystyrene, and 5 to 15 parts by weight of the hydrogenated block copolymer.

Embodiment 18: A method for improving the chlorine resistance of high density polyethylene pipe, comprising: lining the high density polyethylene pipe with a layer of a lining composition comprising 20 to 70 parts by weight of a poly(phenylene ether), 30 to 80 parts by weight of a polystyrene, and 0 to 15 parts by weight of a hydrogenated block copolymer of an alkenyl aromatic monomer and a conjugated diene; wherein the parts by weight are based on 100 parts by weight total of the poly(phenylene ether), the polystyrene, and the hydrogenated block copolymer.

Embodiment 19: The method of embodiment 18, wherein the high density polyethylene pipe comprises 95 to 100 weight percent high density polyethylene; wherein the poly(phenylene ether) comprises a poly(2,6-dimethyl-1,4-phenylene ether) having an intrinsic viscosity of 0.3 to 0.6 deciliter per gram, measured at 25° C. in chloroform; wherein the polystyrene comprises an atactic homopolystyrene having a having a melt flow index of 1.5 to 3.5 grams per 10 minutes measured according to ISO 1133-4 (2011) at 200° C. and 5 kilogram load; wherein the hydrogenated block copolymer comprises a polystyrene-poly(ethylene-butylene)-polystyrene triblock copolymer having a weight average molecular weight of 200,000 to 400,000 daltons; and wherein the inner layer composition comprises 35 to 45 parts by weight of the poly(phenylene ether), 42 to 52 parts by weight of the polystyrene, and 5 to 15 parts by weight of the hydrogenated block copolymer.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

EXAMPLES 1-6

Components used to prepare the poly(phenylene ether) compositions are summarized in Table 1.

TABLE 1

| Component | Description |
| --- | --- |
| PPE | Poly(2,6-dimethyl-1,4-phenylene ether), CAS Reg. No. 24938-67-8, having an intrinsic viscosity of about 0.40 deciliter per gram as measured in chloroform at 25° C.; obtained as PPO ™ 640 Resin from SABIC Innovative Plastics. |
| PS | Atactic polystyrene, CAS Reg. No. 9003-53-6, having a melt flow index of 1.9 to 2.9 grams per 10 minutes measured at 200° C. and 5 kilogram load, obtained as EMPERA ™ 251N Resin from Ineos Styrenics International SA. |
| SEBS | Polystyrene-poly(ethylene-butylene)-polystyrene triblock copolymer, CAS Reg. No. 66070-58-4, having a polystyrene content of about 30 to 33 weight percent and a weight average molecular weight of about 253,000 to 310,000 daltons; obtained as KRATON ™ G1651 Resin from Kraton Polymers Nederland. |
| LDPE | Low density polyethylene, CAS Reg. No. 9002-88-4, having a density of 0.919 gram/milliliter at 25° C., a melt flow index of 22 grams/10 minutes measured at 190° C. and 2.16 kilogram load, milled to a particle diameter of about 1000 micrometers; obtained as LDPE 1922SF from SABIC Petrochemicals BV. |

TABLE 1-continued

| Component | Description |
|---|---|
| TBPP | Tris(2,4-di-tert-butylphenyl) phosphite, CAS Reg. No. 31570-04-4; obtained as IRGAFOS ™ 168 from BASF. |
| ZnO | Zinc oxide, CAS Reg. No. 1314-13-2; obtained as SACHTOLITH ™ HD-S from Sachtleben. |
| ZnS | Zinc sulfide, CAS Reg. No. 1314-98-3; obtained as HARZSIEGEL ™ CF from Norkem Norzinco GmbH. |

All components except for atactic polystyrene were dry-blended before compounding. Compositions were compounded on a 28 millimeter internal diameter twin-screw Werner & Pfleiderer extruder operating at a throughput of about 20 kilograms per hour and barrel temperatures of 40° C./210° C./260° C./280° C./280° C./270° C./280° C./280° C./290° C./290° C./300° C. from feed throat to die. All components were added at the feed throat. The extrudate was cooled in a water bath and pelletized, and the pellets were dried for 2 hours at 80° C. before use for injection molding.

Test articles for physical property testing were injection molded on an Engel 110T injection molding machine operating with barrel temperatures of 260 to 280° C. and a mold temperature of 80° C.

Compositions and properties are summarized in Table 2, where component amounts are expressed in parts by weight based on 100 parts by weight total of poly(phenylene ether), polystyrene, and hydrogenated block copolymer. Charpy impact strength values, expressed in units of kilojoules/meter$^2$ (kJ/m$^2$), were determined at −30, 0, and 23° C. according to ISO 179-1 (2010) using Method ISO 179-1/1 eA, an edgewise impact geometry, notched samples, bar dimensions of 80×10×4 millimeters, a pendulum energy of 4.2 joules, and five samples per composition. Flexural modulus and flexural strength values, each expressed in units of megapascals (MPa), and flexural strain at strength and stress at 3.5% strain values, each expressed in units of percent, were determined according to ISO 178-4 (2010) at 23° C. using bar dimensions of 80×10×4 millimeters, a support span of 64 millimeters, a test speed of 2 millimeters per minute, and five samples per composition. Heat deflection temperature (HDT) values, expressed in units of ° C., were determined according to ISO 75-1 and 75-2 (2004) using bar dimensions of 80×10×4 millimeters, a flatwise test direction, a loading fiber stress of 1.80 megapascals, and two samples per composition. Izod Notched Impact strength (INI) values, expressed in units of kilojoules/meter$^2$, were determined at −30, 0, and 23° C. according to ISO 180-1 (2006) using bar dimensions of 80×10×4 millimeters, notched samples, a pendulum energy of 5.5 joules, and five samples per composition. Multiaxial impact (MAI) puncture energy and energy at maximum force values, each expressed in units of joules, and deflection at break values, expressed in units of millimeters, were determined at 23° C. according to ISO 6603-2 (2000) using a test speed of 4.4 meters per second and five samples per composition. Values of tensile modulus, tensile stress at yield, and tensile stress at break, each expressed in units of megapascals, and values of tensile strain at yield and tensile strain at break, each expressed in units of percent, were determined at 23° C. according to ISO 527-1 and 527-2 (2012) using a test speed of 50 millimeters/minute and five samples per composition. Vicat softening temperature values, expressed in units of degrees centigrade, were determined according to ISO 306-4 (2004) using a 50 newton load and a test rate of 120° C. per hour and two samples per composition. Melt volume flow rate values, expressed in units of cubic-centimeters per 10 minutes, were determined according to ISO 1133-4 (2011) using pre-testing drying for 2 hours at 80° C., a temperature of 280° C., a 5 kilogram load, and a test time of 900 seconds.

TABLE 2

| | Ex. 1 | Ex. 2 | Ex. 3 | Ex. 4 | Ex. 5 | Ex. 6 |
|---|---|---|---|---|---|---|
| COMPOSITIONS | | | | | | |
| PS | 58.76 | 55.70 | 52.65 | 50.36 | 47.56 | 43.48 |
| PPE | 41.24 | 41.24 | 41.24 | 41.24 | 41.24 | 41.24 |
| SEBS | 0.00 | 3.05 | 6.11 | 8.40 | 11.20 | 15.27 |
| TBPP | 0.10 | 0.10 | 0.10 | 0.10 | 0.10 | 0.10 |
| ZnO | 0.10 | 0.10 | 0.10 | 0.10 | 0.10 | 0.10 |
| ZnS | 0.10 | 0.10 | 0.10 | 0.10 | 0.10 | 0.10 |
| LDPE | 1.53 | 1.53 | 1.53 | 1.53 | 1.53 | 1.53 |
| PROPERTIES | | | | | | |
| Charpy impact, 23° C. (J) | 1.93 | 2.08 | 3.25 | 6.29 | 14.55 | 30.72 |
| Charpy impact, 0° C. (J) | 1.98 | 2.23 | 3.25 | 5.22 | 8.95 | 22.02 |
| Charpy impact, −30° C. (J) | 1.84 | 2.23 | 2.82 | 3.25 | 4.19 | 6.69 |
| Flex. modulus (MPa) | 2936 | 2838 | 2697 | 2520 | 2373 | 2171 |
| Flex. strength (MPa) | 115.93 | 108.85 | 101.71 | 93.46 | 86.95 | 78.79 |
| Flex. strain at strength (%) | 5.82 | 5.92 | 5.96 | 5.81 | 5.8 | 5.74 |
| Flex. stress at 3.5% strain (MPa) | 94.41 | 88.68 | 83.39 | 78.07 | 73.38 | 67.02 |
| HDT (° C.) | 117.8 | 118.3 | 118.15 | 118.25 | 118.7 | 119.15 |
| INI, 23° C. (kJ/m$^2$) | 1.9 | 1.98 | 4.23 | 5.76 | 16.81 | 28.17 |
| INI, 0° C. (kJ/m$^2$) | 1.87 | 1.94 | 4.30 | 4.42 | 7.83 | 21.24 |
| INI, −30° C. (kJ/m$^2$) | 1.98 | 1.90 | 2.13 | 3.67 | 4.03 | 5.84 |
| MAI puncture energy, 23° C. (J) | 1.76 | 3.42 | 6.80 | 19.38 | 73.74 | 90.18 |
| MAI energy at max. force, 23° C. (J) | 1.68 | 3.00 | 6.30 | 15.16 | 49.86 | 61.4 |
| MAI deflection at break, 23° C. (mm) | 2.88 | 5.28 | 4.66 | 7.64 | 15.64 | 17.84 |
| MAI puncture energy, 0° C. (J) | 1.46 | 1.46 | 9.84 | 12.76 | 31.62 | 73.68 |

TABLE 2-continued

|  | Ex. 1 | Ex. 2 | Ex. 3 | Ex. 4 | Ex. 5 | Ex. 6 |
|---|---|---|---|---|---|---|
| MAI energy at max. force, 0° C. (J) | 1.38 | 1.30 | 8.58 | 11.98 | 28.92 | 55.48 |
| MAI deflection at break, 0° C. (mm) | 2.54 | 2.60 | 5.82 | 5.74 | 9.26 | 15.74 |
| MAI puncture energy, −30° C. (J) | 1.16 | 1.48 | 4.62 | 10.22 | 16.74 | 35.18 |
| MAI energy at max. force, −30° C. (J) | 1.12 | 1.38 | 4.40 | 9.92 | 15.42 | 33.66 |
| MAI deflection at break, −30° C. (mm) | 2.26 | 2.78 | 4.30 | 5.22 | 6.86 | 9.64 |
| Tens. modulus (MPa) | 2968 | 2826.8 | 2724.4 | 2560.4 | 2409.8 | 2226.2 |
| Tens. stress at yield (MPa) | 80.28 | 78.69 | 74.76 | 67.73 | 62.11 | 56.24 |
| Tens. stress at break (MPa) | 79.28 | 76.98 | 66.46 | 49.76 | 45.67 | 44.47 |
| Tens. strain at yield (%) | 3.70 | 4.38 | 4.20 | 3.89 | 3.76 | 3.67 |
| Tens. strain at break (%) | 3.6 | 4.3 | 4.2 | 3.8 | 3.9 | — |
| Vicat temp. (° C.) | 135.8 | 136.5 | 137.6 | 137.3 | 137.6 | 137.0 |
| MVR (cm$^3$/10 min) | 24.91 | 23.48 | 20.54 | 17.08 | 14.56 | 11.90 |

Coextrusion of Lined Pipe

Coextrusion is the extrusion of multiple layers of material simultaneously. Coextrusion utilizes two or more extruders to melt and deliver a steady volumetric throughput of different viscous plastics to a single extrusion head (die) from which the materials are extruded in the desired form. The layer thicknesses are controlled by the relative speeds and sizes of the individual extruders delivering the materials.

An outer layer consisting of high density polyethylene (HDPE) and having an annular cross-section was extruded at a melt temperature of about 245° C. The high density polyethylene had a melt flow index of 0.23 decigrams/10 minutes measured at 190° C. and 5 kilogram load. It was obtained as VESTOLEN A RELY 5924R Resin from SABIC. An inner layer consisting of the Example 5 composition above and having an annular cross-section was coextruded at a melt temperature of about 245° C. Relatively greater contraction of the outer layer relative to the inner layer on cooling from 245 to 25° C. resulted in a lined pipe in which the inner surface of the outer layer was in contact with the outer surface of the inner layer.

Examples 7 and 8, Comparative Example 1

The procedure above was used to prepare three pipe samples, each having an outer diameter of 32 millimeters and a total wall thickness of 3.2 millimeters. The Comparative Example 1 pipe sample had no liner. Its wall thickness was composed entirely of HDPE. The Examples 7 and 8 pipe samples were lined. The wall thickness of the Example 7 pipe sample was composed of 3.05 millimeters of HDPE and 0.15 millimeter of the Example 5 composition. The wall thickness of the Example 8 pipe sample was composed of 2.8 millimeters of HDPE and 0.40 millimeter of the Example 5 composition.

Figure 4:
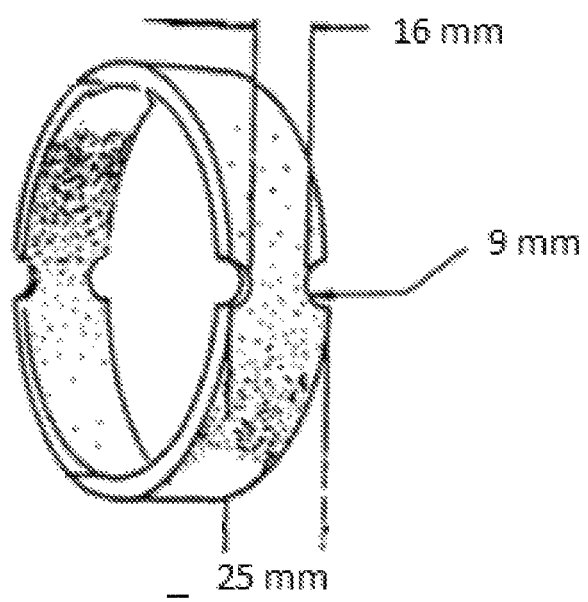
FIG. 4 is a perspective view of an annular pipe section used as a test sample for tensile testing.

Resistance of the pipe samples to chemical attack by chlorine dioxide was determined as follows. Annular sections of each pipe sample were prepared having the dimensions illustrated in FIG. 4. The width of each annular section was 25 millimeters, except where the width was reduced to 16 millimeters by semicircular 9 millimeter diameter holes at each edge of the of the annular section.

Tensile testing of annular sections was conducted according to ASTM D 2290-12 and utilized a Lloyd LR30K draw bench with a 10 kilonewton maximum force. Testing was conducted at a speed of 12.7 millimeters per minute (Procedure A). For each pipe sample, five annular sections were tested, and the results averaged to provide the elongation at break values in Table 3.

Figure 5:
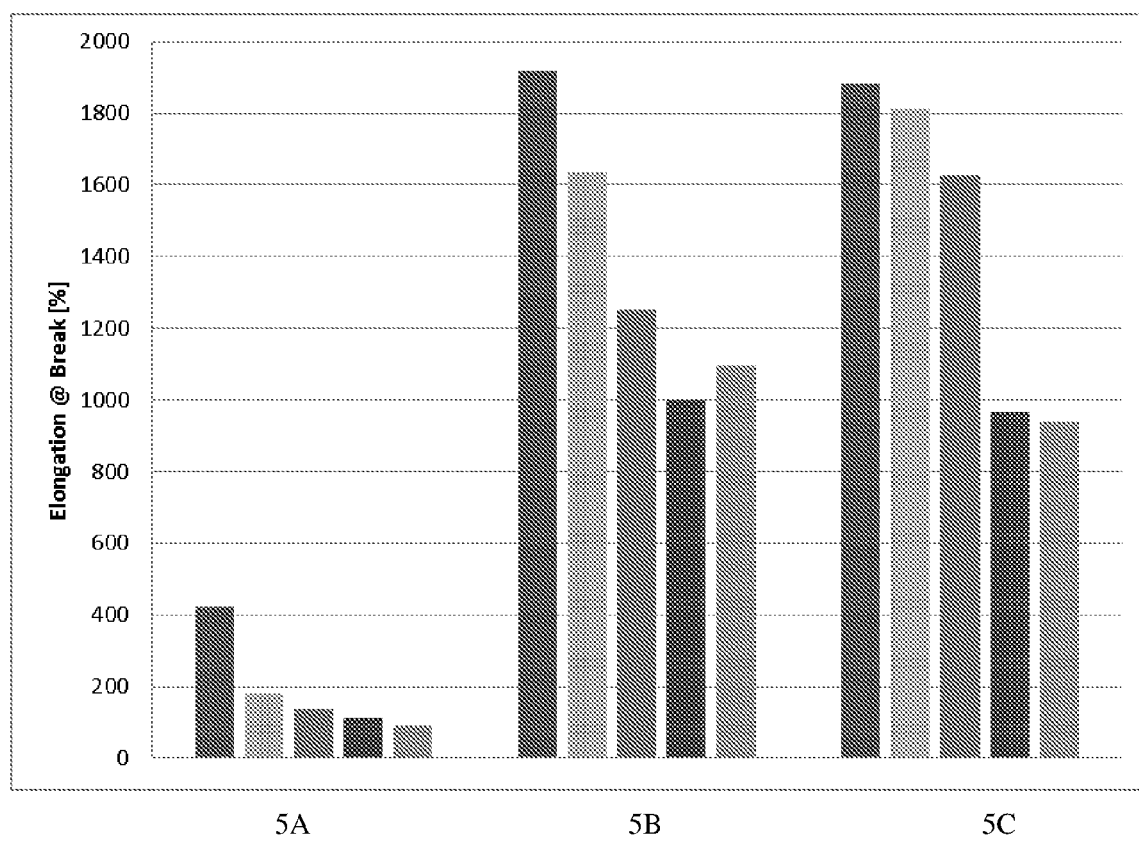
FIG. 5 consists of three graphs of tensile elongation at break as a function of 0, 1, 2, 3, or 4 months (from left to right within each graph) of exposure to a chlorine dioxide solution; 5A is the graph for the Comparative Example 1 pipe in which the 3.2 millimeter wall thickness consists of high density polyethylene; 5B is the graph for the Example 7 pipe in which the 3.2 millimeter wall thickness consists of a 3.05 millimeter thick outer layer of high density polyethylene and a 0.15 millimeter thick inner layer of the Example 5 poly(phenylene ether) composition; 5C is the graph for the Example 8 pipe in which the 3.2 millimeter wall thickness consists of a 2.8 millimeter thick outer layer of high density polyethylene and a 0.4 millimeter thick inner layer of the Example 5 poly(phenylene ether) composition.

Annular sections were prepared from pipe sections that had been exposed after 0, 1, 2, 3, or 4 months to an aqueous solution having a chlorine dioxide concentration of 1 milligram per liter, a calcium carbonate concentration of 200 milligrams per liter, a pH of 7.2, a temperature of 40° C., and a pressure of 6 bar (0.6 megapascal). The aqueous solution passed through the pipe sections was continuously renewed and contained oxygen due to the use of a semi-open hydraulic system with a solution residence time of 4 hours. Tensile elongation at break values, expressed in units of percent, are presented in Table 3 and FIG. 5. FIG. 5 consists of three graphs of tensile elongation at break as a function of 0, 1, 2, 3, or 4 months (from left to right within each graph) of exposure to a chlorine dioxide solution; 5A is the graph for the Comparative Example 1 pipe in which the 3.2 millimeter wall thickness consists of high density polyethylene; 5B is the graph for the Example 7 pipe in which the 3.2 millimeter wall thickness consists of a 3.05 millimeter thick outer layer of high density polyethylene and a 0.15 millimeter thick inner layer of the Example 5 poly(phenylene ether) composition; 5C is the graph for the Example 8 pipe in which the 3.2 millimeter wall thickness consists of a 2.8 millimeter thick outer layer of high density polyethylene and a 0.4 millimeter thick inner layer of the Example 5 poly(phenylene ether) composition.

These results show that use of a poly(phenylene ether)-based liner in a polyethylene pipe provides large increases in tensile elongation, which are expected to correlate with increased functional life spans for corresponding pipe. At one and two months of exposure to the chlorine dioxide solution, the 0.4 millimeter thick liner provides a tensile elongation advantage relative to the 0.15 millimeter thick liner, but at three and four months, the tensile elongation values are similar for the two liner thicknesses.

TABLE 3

| ClO$_2$ aging (months) | C. Ex. 1 | Ex. 7 | Ex. 8 |
|---|---|---|---|
| 0 | 423 | 1917 | 1883 |
| 1 | 180 | 1637 | 1813 |
| 2 | 137 | 1250 | 1627 |
| 3 | 110 | 1000 | 967 |
| 4 | 93 | 1097 | 940 |

The invention claimed is:
1. A lined pipe or fitting comprising:
 an outer layer composition comprising an outer layer composition comprising, based on the total weight of the outer layer composition, 50 to 100 weight percent high density polyethylene and 0 to 50 weight percent filler; and an inner layer comprising an inner layer composition comprising
  20 to 70 parts by weight of a poly(phenylene ether),
  30 to 80 parts by weight of an atactic homopolystyrene having a melt flow index of 1.5 to 5 grams per 10 minutes measured according to ISO 1133-4 (2011) at 200° C. and 5 kilogram load, and
  5 to 15 parts by weight of a hydrogenated block copolymer of an alkenyl
  aromatic monomer and a conjugated diene,
wherein the parts by weight are based on 100 parts by weight total of the poly(phenylene ether), the polystyrene, and the hydrogenated block copolymer.

2. The lined pipe or fitting of claim 1, wherein the lined pipe or fitting is used for potable water, and the inner layer composition comprises less than 1 part per million by weight of free butadiene.

3. The lined pipe or fitting of claim 2, wherein the inner layer composition excludes rubber-modified polystyrene.

4. The lined pipe or fitting of claim 1, wherein the hydrogenated block copolymer comprises a polystyrene-poly(ethylene-butylene)-polystyrene triblock copolymer having a weight average molecular weight of 200,000 to 400,000 daltons.

5. The lined pipe or fitting of claim 1, wherein the inner layer composition excludes glass fibers.

6. The lined pipe or fitting of claim 1, wherein the inner layer composition excludes polyamides.

7. The lined pipe or fitting of claim 1, wherein the inner layer composition comprises 0 to 2 parts by weight of polyolefins.

8. The lined pipe or fitting of claim 1, wherein the outer layer has an outer diameter of 20 millimeters to 1.6 meters and a ratio of outer diameter to wall thickness of 7:1 to 45:1.

9. The lined pipe or fitting of claim 1, wherein the outer layer has an outer diameter of 20 millimeters to 1.6 meters and a ratio of outer diameter to wall thickness of 7:1 to 45:1; and wherein the inner layer has a wall thickness of 50 micrometers to one-third the wall thickness of the outer layer.

10. The lined pipe or fitting of claim 1, further comprising at least one intermediate layer disposed between the outer layer and the inner layer.

11. The lined pipe or fitting of claim 10, wherein the at least one intermediate layer comprises a material selected from the group consisting of aromatic epoxy resins, acid-functionalized polyolefins, acid-functionalized poly(phenylene ether)s, styrene-maleic anhydride copolymers, and combinations thereof.

12. The lined pipe or fitting of claim 1,
wherein the outer layer composition comprises 95 to 100 weight percent high density polyethylene;
wherein the poly(phenylene ether) comprises a poly(2,6-dimethyl-1,4-phenylene ether) having an intrinsic viscosity of 0.3 to 0.6 deciliter per gram, measured at 25° C. in chloroform;
wherein the polystyrene comprises an atactic homopolystyrene having a having a melt flow index of 1.5 to 3.5 grams per 10 minutes measured according to ISO 1133-4(2011) at 200° C. and 5 kilogram load;
wherein the hydrogenated block copolymer comprises a polystyrene-poly (ethylene-butylene)-polystyrene triblock copolymer having a weight average molecular weight of 200,000 to 400,000 daltons; and
wherein the inner layer composition comprises
  35 to 45 parts by weight of the poly(phenylene ether),
  42 to 52 parts by weight of the polystyrene, and
  5 to 15 parts by weight of the hydrogenated block copolymer.

13. A method of forming a lined pipe or fitting, comprising:
coextruding
  an outer layer, annular in cross-section and characterized by a first outer diameter, a first inner diameter and a first wall thickness; wherein the outer layer comprises an outer layer composition comprising, based on the total weight of the outer layer composition, 50 to 100 weight percent high density polyethylene and 0 to 50 weight percent filler; and
  an inner layer, annular in cross-section and characterized by a second outer diameter less than the first inner diameter, a second inner diameter, and a second wall thickness; wherein the inner layer comprises an inner layer composition comprising
    20 to 70 parts by weight of a poly(phenylene ether),
    30 to 80 parts by weight of an atactic homopolystrene having melt flow index of 1.5 to 5 grams per 10 minutes measured according to ISO 1133-4 (2011) at 200° C. and 5 kilogram load, and
    5 to 15 parts by weight of a hydrogenated block copolymer of an alkenyl aromatic monomer and a conjugated diene,
    wherein the parts by weight are based on 100 parts by weight total of the poly(phenylene ether), the polystyrene, and the hydrogenated block copolymer.

14. The method of claim 13,
wherein the outer layer composition comprises 95 to 100 weight percent high density polyethylene;
wherein the poly(phenylene ether) comprises a poly(2,6-dimethyl-1,4-phenylene ether) having an intrinsic viscosity of 0.3 to 0.6 deciliter per gram, measured at 25° C. in chloroform;
wherein the polystyrene comprises an atactic homopolystyrene having a having a melt flow index of 1.5 to 3.5 grams per 10 minutes measured according to ISO 1133-4(2011) at 200° C. and 5 kilogram load;
wherein the hydrogenated block copolymer comprises a polystyrene-poly(ethylene-butylene)-polystyrene triblock copolymer having a weight average molecular weight of 200,000 to 400,000 daltons; and
wherein the inner layer composition comprises
  35 to 45 parts by weight of the poly(phenylene ether),
  42 to 52 parts by weight of the polystyrene, and
  5 to 15 parts by weight of the hydrogenated block copolymer.

15. A method for improving the chlorine resistance of high density polyethylene pipe, comprising:
lining a high density polyethylene pipe comprising 50 to 100 weight present high density polyethylene and 0 to 50 weight percent filler, with a layer of a lining composition comprising
  20 to 70 parts by weight of a poly(phenylene ether),
  30 to 80 parts by weight of an atactic homopolystyrene having a melt flow index of 1.5 to 5 grams per 10 minutes measured according to ISO 1133-4 (2011) at 200° C. and 5 kilogram load, and
  5 to 15 parts by weight of a hydrogenated block copolymer of an alkenyl
  aromatic monomer and a conjugated diene;
wherein the parts by weight are based on 100 parts by weight total of the poly(phenylene ether), the polystyrene, and the hydrogenated block copolymer.

16. The method of claim 15,
wherein the high density polyethylene pipe comprises 95 to 100 weight percent high density polyethylene;
wherein the poly(phenylene ether) comprises a poly(2,6-dimethyl-1,4-phenylene ether) having an intrinsic viscosity of 0.3 to 0.6 deciliter per gram, measured at 25° C. in chloroform;
wherein the polystyrene comprises an atactic homopolystyrene having a having a melt flow index of 1.5 to 3.5 grams per 10 minutes measured according to ISO 1133-4(2011) at 200° C. and 5 kilogram load;
wherein the hydrogenated block copolymer comprises a polystyrene-poly(ethylene-butylene)-polystyrene triblock copolymer having a weight average molecular weight of 200,000 to 400,000 daltons; and
wherein the inner layer composition comprises
  35 to 45 parts by weight of the poly(phenylene ether),
  42 to 52 parts by weight of the polystyrene, and
  5 to 15 parts by weight of the hydrogenated block copolymer.

* * * * *